Dec. 14, 1965   R. J. SHAFRANEK ETAL   3,223,916
BRUSHLESS ROTARY INVERTER
Filed Feb. 5, 1962   2 Sheets-Sheet 1

INVENTORS
Robert J. Shafranek
BY Janis Tiltins

ATTORNEYS

Dec. 14, 1965   R. J. SHAFRANEK ETAL   3,223,916
BRUSHLESS ROTARY INVERTER
Filed Feb. 5, 1962   2 Sheets-Sheet 2
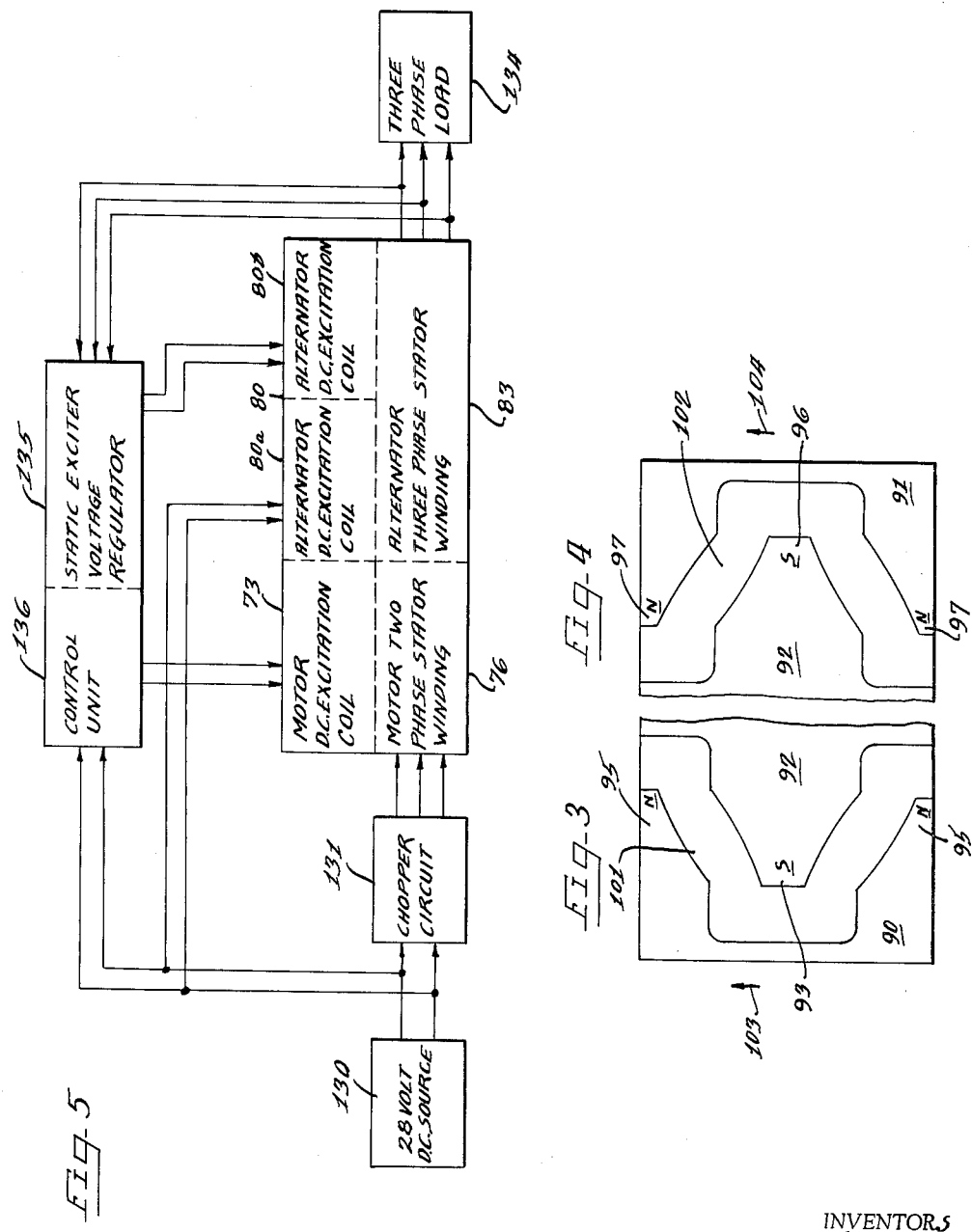
INVENTORS
Robert J. Shafranek
BY Janis Tiltins
ATTORNEYS

United States Patent Office 3,223,916
Patented Dec. 14, 1965

3,223,916
BRUSHLESS ROTARY INVERTER
Robert J. Shafranek, Kent, and Janis Tiltins, Cleveland, Ohio, assignors to TRW Inc., a corporation of Ohio
Filed Feb. 5, 1962, Ser. No. 170,888
4 Claims. (Cl. 321—28)

This invention relates to a rotary inverter for converting direct current power to alternating current power.

Rotary inverters heretofore used in aircraft applications have consisted of a direct current motor operating from battery power, a salient pole alternator coupled to the direct current motor to supply an alternating current output, a frequency control to hold the speed of the direct current motor constant to maintain a predetermined frequency output from the alternator, and a voltage regulator to hold the voltage output of the alternator constant. There are many disadvantages to available rotary inverters.

The use of a direct current motor presents brush-wear problems associated with high altitude operation. The commutator on the motor limits the operating speed and must be cooled to prevent misalignment of the bars during operation. The alternators used require a minimum of four poles due to mechanical problems associated with holding the excitation windings in place on the rotor. Also, the rotor windings require cooling and brushes and slip rings to get the excitation power into the rotor.

The maximum speed of the inverter is limited to 12,000 revolutions per minute for 400 cycle per second aircraft applications due to the commutator, windings, number of poles, etc. Since the size and weight of rotating equipment varies inversely with speed, the minimum weight for existing equipment is that of the 12,000 revolution per minute units. These prior art rotary inverters require a relatively large fan to force air through the unit and cool the commutator, brushes, rotating windings on the motor and rotating windings on the alternator. The efficiency of the rotary inverter is low, approximately 50% maximum for the higher ratings, due to the brush friction, windage and fan losses.

The inverter of the present invention enables increasing operating speed to 24,000 revolutions per minute for a 400 cycle per second system with a corresponding reduction in size and weight, increased efficiency and increased reliability.

It is therefore an important object of the present invention to provide a unitary, rugged and reliable rotary inverter assembly providing reduced size and weight and increased efficiency.

It is a further object of the present invention to provide a rotary inverter assembly providing excellent wave shape without filters, which can tolerate short circuit conditions without damage and eliminates the need for power output transformers such as are required in a conventional static inverter.

Other objects, features and advantages of the present invention will be apparent from the following detailed description taken in connection with the accompanying drawings, in which:

FIGURE 3 is a fragmentary developed view of a portion of the rotor showing the non-magnetic separator member utilized in the motor section of the rotor;

FIGURE 4 is a frgamentary developed view of another portion of the rotor showing the non-magnetic separator utilized in the alternator section of the rotor; and FIGURE 5 is a block diagram illustrating the electrical connections to the inverter assembly of FIGURE 1.

Figure 1:
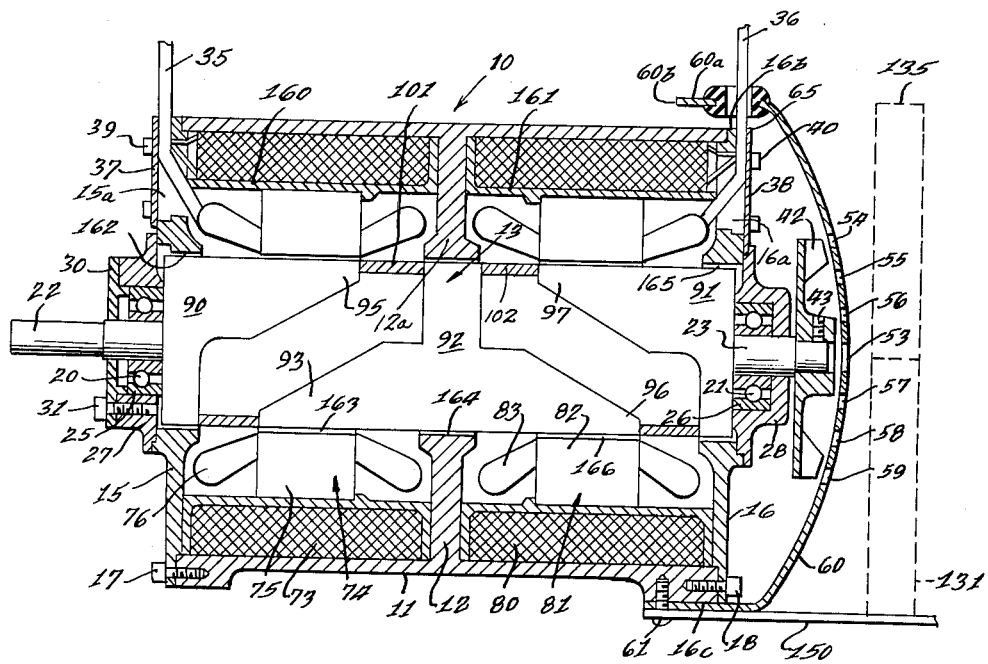
FIGURE 1 is a somewhat diagrammatic longitudinal sectional view of a rotary inverter assembly in accordance with the present invention.

FIGURE 1 illustrates a rotary inverter assembly 10 in accordance with the present invention. The housing for the assembly comprises a generally cylindrical casing 11 of magnetic material having a central partition flange 12 projecting radially inwardly and terminating in an annular polar portion 12a spaced from a rotor assembly 13 by means of a suitable air gap. The housing further comprises end caps 15 and 16 secured to the casing or frame 11 by suitable screws such as indicated at 17 and 18. The end plates 15 and 16 carry suitable bearing means indicated generally at 20 and 21 receiving the shaft portions 22 and 23 of the rotor assembly 13. The bearing means 20 and 21 comprise stationary rings 25 and 26 which are carried in end plates 27 and 28. The end plates are in turn secured to the end caps 15 and 16, respectively. A cover plate 30 is shown surrounding the shaft portion 22 and secured to end plate 27 by screw means such as indicated at 31. The end caps 15 and 16 are provided with apertures such as indicated at 15a and 16a through which the motor leads generally indicated at 35 and alternator leads generally indicated at 36 extend. Cover plates 37 and 38 are secured in overlying relation to the apertures by means of screws such as indicated at 39 and 40.

An impeller member 42 is secured to the shaft portion 23, for example by means of a set screw 43 so as to rotate with the shaft and produce a flow of air or other gaseous medium over the exterior surface of the inverter assembly. By way of example, notches may be provided about the periphery of the end plate 16 such as indicated at 16b alternately with the screws 18 so as to provide an inlet for air to the impeller chamber of the housing. Air may be exhausted from the housing by means of the fan member 42 through apertures such as indicated at 53–59 in a fan cover member 60 which is secured to the casing 11 by means of screws such as indicated at 61. It will be noted that the cover 60 has an axially extending margin portion 60a terminating in an annular edge 60b which at portions about the periphery thereof is spaced from the margin 16b of the end plate 16 so as to define a series of inlet apertures such as indicated at 65. The end plate 16 is notched at the periphery thereof to provide the passages 65 and has boss portions such as indicated at 16c through which the screw means such as 18 extend alternately with the notches 65. The circulation of air may be generally in an axial direction along the casing 11 and through the notches 65 in the end plate 16 and then outwardly through the openings such as 53–59 in the fan cover 60. The circulation of air provides sufficient cooling action since only the stator requires such cooling action and no rotor cooling to required.

At one axial side of the partition 12 is located an annular direct current excitation winding 73 and a two phase stator assembly 74 including stator laminations 75 and a two phase stator winding 76. At the opposite axial side of the partition 12 is located a direct current excitation coil 80 and a three-phase stator assembly 81 including stator laminations 82 and a three-phase winding 83. The stator assemblies are preferably of conventional laminated construction and the winding arrangements 76 and 83 may likewise be conventional.

The shaft assembly 13 may comprise a one pole rotor element 90 of magnetic material integral with shaft portion 22, a one pole rotor element 91 of magnetic material integral with shaft portion 23 and an intermediate rotor element 92 of magnetic material having a pole portion 93 cooperating with the pole portion such as 95 of the rotor element 90 and having a single pole portion 96 coacting with the pole portion 97 of the rotor element 91. The pole portion 95 of rotor element 90 is visible in FIGURE 2 along with pole portions 93 and 96 of rotor element 92 and pole portion 97 of rotor element 91.

The rotor elements 90 and 92 are separated by means of a non-magnetic spacer member 101 having a developed configuration as indicated in FIGURE 3, and the rotor elements 92 and 91 are separated by a non-magnetic spacer member 102 having a developed configuration as indicated in FIGURE 4.

Referring to FIGURES 3 and 4, it will be understood that the direction of rotation may be represented in FIGURE 3 by the arrow 103 and may be represented in FIGURE 4 by the arrow 104.

Figure 2:
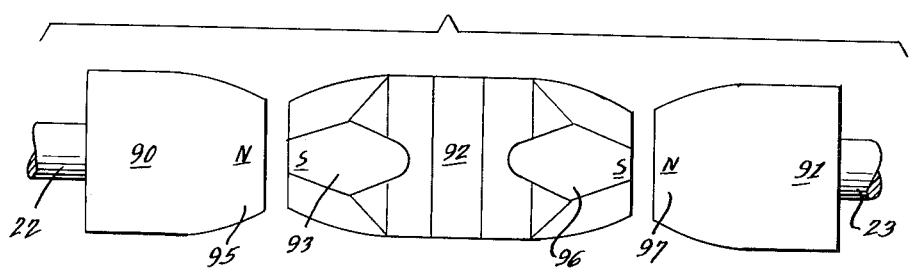
FIGURE 2 is a somewhat diagrammatic exploded view illustrating the magnetic portions of the rotor of the inverter assembly.

The polarity of the direct current to the excitation windings 73 and 80 may be such as to induce magnetic poles in the rotor of north and south polarity as indicated by the letters N and S in FIGURES 2–4.

The motor two phase stator winding 76 is supplied with a two phase voltage by means of a direct current source 130 and chopper circuit 131. As indicated in FIGURE 5, the direct current source 130 also supplies direct current to the motor direct current excitation coil 73 and the alternator direct current excitation coil 80a. By way of specific example, the chopper circuit 131 may operate at 400 cycles per second or multiples of 400 cycles to produce a motor speed of 24,000 revolutions per minute under synchronous conditions. The three phase alternating current output from the stator winding 83 is shown as being delivered to a load component 134 and to the input of a static exciter voltage regulator component 135. The regulator 135 may be coupled to a second direct current excitation coil 80b of the excitation winding section 80 so as to control the output voltage from the alternator.

When direct current power is supplied to the chopper and to the alternator excitation winding 80a, rotor assembly 13 accelerates to synchronous speed. The static circuit such as the chopper circuit 131 required to provide the power to the two phase stator winding 76 can be relatively simple since the motor section can accept square wave excitation. Filters in the output of the chopper section are therefore not required. Feeding power directly into the motor stator winding eliminates the need for a transformer in the chopper circuit.

As the motor section comes up to synchronous speed, the alternator voltage increases. Partial excitation, enough to provide no load alternator voltage, is supplied to excitation coil 80a directly from the direct current source 130 which may, for example, have a 28 volt output. The static exciter voltage regulator component 135 accepts the alternator output voltage and frequency and provides controlled direct current power to a second excitation coil 80b in the alternator section. The regulator maintains constant alternator output voltage over the load range.

A conventional static inverter is much more complicated and larger than all of the control equipment illustrated in FIGURE 5 for the following reasons: (1) the true conventional static circuit must provide three phase power as compared to two phase as illustrated in FIGURE 5; (2) the conventional static inverter requires output power transformers; (3) the conventional static system requires special circuits to produce an output voltage with low harmonics; (4) the true static system requires filters; and (5) the conventional static system must be capable of operating at unbalanced loads for many applications. In the embodiment shown in FIGURE 5, the alternator operates at unbalanced load and this is reflected back to the motor exciting chopper circuit 131 as a balanced load.

The system of the present invention offers the following advantages: (1) elimination of brushes; (2) elimination of commutators and slip ring; (3) elimination of rotating windings; (4) elimination of rotor cooling (the unit can be cooled completely by external means such as fan member 42 shown in FIGURE 1); (5) improved efficiency over the conventional rotating inverter; (6) operates at 24,000 revolutions per minute and offers large reduction in weight and space as compared to conventional rotary and static inverters; (7) provides excellent wave shape without filters; (8) can tolerate short circuit without damage; (9) eliminates need for power output transformer; (10) reduces cooling fan power required and can conveniently cool electronic chopper 131 and regulator 135 with the chopper and regulator components mounted directly at the discharge side of the fan member 42 and carried by the inverter assembly 10, for example on the frame member 150 as indicated diagrammatically in dash outline; (11) the chopper circuit 131 can operate at 400 cycles per second or multiples of 400 cycles to reduce the size of the components. (The motor will have two poles or more to provide 24,000 revolutions per minute synchronous speed.)

It will be understood that the parts 11, 12, 15, 16, 90, 91 and 92 are of magnetic material to provide a relatively efficient magnetic circuit in association with the annular excitation windings 73 and 80. The stator supporting members 160 and 161 will be of non-magnetic material. The D.C. excitation coils 73 and 80 are, of course, wound on the annular non-magnetic housing parts 160 and 161 in encircling relation to the stator sections 74 and 81.

The magnetic flux produced by the excitation coil 73 extends axially in the housing part 11 to the end plate 15 and enters the rotor through the radial parasitic annular gap indicated at 162. The flux then extends from the pole 95 of rotor element 90 circumferentially around the back of the stator iron of stator section 75 and returns radially across the gap 163 between stator 75 and rotor 13 to the pole 93 of rotor element 92. The magnetic circuit is completed through the parasitic gap 164 between the rotor element 92 and the annular pole 12a. Similarly, with respect to excitation coil 80, the magnetic flux extends axially in the housing 11 to the end plate 16 and enters the rotor through the radial parasitic gap 165. The flux extends from pole 97 of rotor element 91 circumferentially around the back of the stator iron of stator section 82 and returns radially across the gap 166 between the stator section 82 and the rotor 13 to the pole 96 of rotor element 92. The magnetic circuit is completed through the parasitic gap 164 to the center partition member 12.

The flux distribution in the gap 163 is established by the shape of the rotor poles 93 and 95. The rotating magnetic field produced by the stator winding 76 interacts with the field of the rotor poles 93 and 95 to exert a driving torque on the rotor operating at synchronous speed. In the alternator section the magnetic flux produced by the excitation winding 80 in the gap 166 is moving with the rotor and generates the output voltage in the three phase stator winding 83. A three phase output is delivered from the alternator section of the inverter to the load 134, FIGURE 5. The output voltage is controlled by adjusting the power delivered to the excitation winding 80b. A conventional static exciter voltage regulator can be used to maintain constant output voltage as indicated at 135 in FIGURE 5.

At the startup of the motor the excitation winding 73 is deenergized. By applying two phase A.C. voltage to the stator winding 76 the rotor accelerates and is pulled into synchronism similar to the conventional reluctance motor. When the rotor approaches synchronous speed a frequency sensitive tuned circuit connected to the alternator output energizes a relay in the control unit 136 that applies the D.C. power to the motor excitation winding 73. At this point the motor operates as a fully energized synchronous motor. The motor will accept relatively poor quality alternating current and no filtering is required. The motor stator winding eliminates the need for a power transformer in the static device. The speed of the motor section is established and maintained by the frequency reference in the static device such as the chopper circuit 131.

The illustrated inverter system provides the following specific advantages: (1) lightweight—approximately 42 pounds for 2500 volt amperes; (2) reduced volume—approximately 300 cubic inches for 2500 volt amperes; (3) high efficiency—70% and (4) eliminates brushes, rotating windings and rotor cooling.

It will be apparent that many modifications and variations may be effected without departing from the scope of the novel concepts of the present invention.

We claim as our invention:

1. A rotary inverter comprising
   (a) a housing having a first two phase stator with a two phase winding thereon and a second multiphase stator with a multiphase winding thereon,
   (b) first and second rotor means mounted for rotation in said housing and coupled to the respective stators,
   (c) static means for converting a direct current input to a two phase generally square wave output,
   (d) means for coupling the output of said static means with the two phase winding of said first stator,
   (e) first rotor excitation means in said housing for coupling to a direct current source and for inducing magnetic poles at said first rotor means,
   (f) means for coupling said second rotor means with said first rotor means for driving of said second rotor means by said first rotor means,
   (g) second rotor excitation means in said housing for coupling to a direct current source and coupled to said second rotor means for inducing magnetic poles at said second rotor means which coact with said multiphase stator to produce a multiphase output current in said multiphase winding thereof, and
   (h) voltage regulator means coupled to said multiphase winding of said second stator and to said second rotor excitation means for controlling the magnetic field intensity at the poles of the second rotor means to maintain a predetermined output voltage from said second stator multiphase winding, and
   (i) said housing having means mounting said static means and said voltage regulator means as a unit therewith.

2. A rotary inverter comprising
   (a) a housing having a first two phase stator with a two phase winding thereon and a second multiphase stator with a multiphase winding thereon,
   (b) first and second rotor means mounted for rotation in said housing and coupled to the respective stators,
   (c) static means for converting a direct current input to a two phase generally square wave output,
   (d) means for coupling the output of said static means with the two phase winding of said first stator,
   (e) first rotor excitation means in said housing for coupling to a direct current source and for inducing magnetic poles at said first rotor means,
   (f) means for coupling said second rotor means with said first rotor means for driving of said second rotor means by said first rotor means,
   (g) second rotor excitation means in said housing for coupling to a direct current source and coupled to said second rotor means for inducing magnetic poles at said second rotor means which coact with said multiphase stator to produce a multiphase output current in said multiphase winding thereof,
   (h) voltage regulator means coupled to said multiphase winding of said second stator and to said second rotor excitation means for controlling the magnetic field intensity at the poles of the second rotor means to maintain a predetermined output voltage from said second stator multiphase winding,
   (i) said housing having means mounting said static means and said voltage regulator means as a unit therewith, and
   (j) gaseous impeller means connected to said rotor means for rotation therewith and producing a flow of a gaseous medium in cooling relation to said static means and said voltage regulator means.

3. A rotary machine comprising
   (a) a generally cylindrical casing of magnetic material having opposite end plates of magnetic material and having a central radially extending partition flange of magnetic material, said end plates and said central partition flange terminating in end plate radially inwardly directed annular polar faces and a central partition radially inwardly directed annular polar face, respectively,
   (b) a rotor assembly mounted for rotation within said casing and comprising outer rotor elements of magnetic material having cylindrical radially outwardly directed faces disposed in closely spaced confronting relation to the respective end plate polar faces and an intermediate rotor element of magnetic material having a cylindrical radially outwardly directed face in closely spaced confronting relation to the central partition annular polar face, said outer rotor elements having axially extending pole portions and said intermediate rotor element having integral pole portions extending axially therefrom in opposite directions and interdigitated with the pole portions of the outer rotor elements to provide respective first and second series of rotor poles,
   (c) means securing said outer and intermediate rotor elements together as a unit for joint rotation,
   (d) first and second excitation means adjacent said casing between the respective end plates and the central partition flange for producing exciting magnetic fluxes extending axially in the casing, radially inwardly in the end plates to the rotor element cylindrical faces, extending from the outer rotor element pole portions to the respective interdigitated intermediate rotor element pole portions and from the intermediate rotor element cylindrical face to the central partition flange, and
   (e) first and second stator means radially inwardly of the first and second excitation means respectively and having first and second series of circumferentially spaced poles respectively cooperating with the first and second series of rotor poles of the rotor assembly.

4. A rotary inverter comprising
   (a) a generally cylindrical casing of magnetic material having opposite end plates of magnetic material and having a central radially extending partition flange of magnetic material, said end plates and said central partition flange terminating in end plate radially inwardly directed annular polar faces and a central partition radially inwardly directed annular polar face, respectively,
   (b) a rotor assembly mounted for rotation within said casing and comprising outer rotor elements of magnetic material having cylindrical radially outwardly directed faces disposed in closely spaced confronting relation to the respective end plate polar faces and an intermediate rotor element of magnetic material having a cylindrical radially outwardly directed face in closely spaced confronting relation to the central partition annular polar face, said outer rotor elements having axially extending pole portions and said intermediate rotor element having integral pole portions extending axially therefrom in opposite directions and interdigitated with the pole portions of the outer rotor elements to provide respective first and second series of rotor poles,
   (c) means securing said outer and intermediate rotor elements together as a unit for joint rotation,
   (d) first and second excitation means adjacent said casing between the respective end plates and the central partition flange for producing exciting magnetic fluxes extending axially in the casing, radially inwardly in the end plates to the outer rotor element cylindrical faces, extending from the outer rotor element pole portions to the respective interdigitated intermediate rotor element pole portions and from the intermediate rotor element cylindrical face to the central partition flange, (e) first and second stator means radially inwardly of the respective first and second excitation means, having first and second series of circumferentially spaced poles respectively cooperating with the first and second series of rotor poles of the rotor assembly, and having a first two phase stator winding coupled to the first series of stator poles and having at least a three phase stator winding coupled with the second series of stator poles, and (f) a chopper circuit delivering a square wave output and connected directly with the two phase stator winding for supplying thereto a square wave excitation to drive said rotor assembly and produce a multiphase output from the second stator winding.

References Cited by the Examiner
UNITED STATES PATENTS

| | | | |
|---|---|---|---|
| 2,023,245 | 12/1935 | Schou | 310—168 |
| 2,692,365 | 10/1954 | Letrilliart | 321—7 |
| 2,692,956 | 10/1954 | Kaczor et al. | 310—168 |
| 2,769,106 | 10/1956 | Dembowski | 310—168 |

LLOYD McCOLLUM, *Primary Examiner.*

ROBERT C. SIMS, *Examiner.*